United States Patent
Diener et al.

(10) Patent No.: US 7,849,250 B2
(45) Date of Patent: Dec. 7, 2010

(54) DOCKING STATION WITH HIERARCHAL BATTERY MANAGEMENT FOR USE WITH PORTABLE MEDICAL EQUIPMENT

(75) Inventors: Alexander M. Diener, Seattle, WA (US); Joel Aragon, Snohomish, WA (US); Bradley J. Sliger, Seattle, WA (US); Byron A. Meseroll, Seattle, WA (US); Uli Rankers, Livermore, CA (US)

(73) Assignee: SonoSite, Inc., Bothell, WA (US)

( * ) Notice: Subject to any disclaimer, the term of this patent is extended or adjusted under 35 U.S.C. 154(b) by 601 days.

(21) Appl. No.: 11/590,010

(22) Filed: Oct. 31, 2006

(65) Prior Publication Data

US 2008/0104300 A1    May 1, 2008

(51) Int. Cl.
*G06F 13/00* (2006.01)
(52) U.S. Cl. ...................... 710/303; 713/330
(58) Field of Classification Search ......... 710/300–340; 320/116–121, 126–134; 361/681, 679; 600/354, 600/441–447; 713/300–340
See application file for complete search history.

(56) References Cited

U.S. PATENT DOCUMENTS

| | | | |
|---|---|---|---|
| 5,603,323 A | 2/1997 | Pflugrath et al. | |
| 5,640,960 A | 6/1997 | Jones et al. | |
| 5,687,717 A | 11/1997 | Halpern et al. | |
| 5,715,823 A | 2/1998 | Wood et al. | |
| 5,729,587 A | 3/1998 | Betz | |
| 5,795,297 A | 8/1998 | Daigle | |
| 5,821,731 A | 10/1998 | Kuki et al. | |
| 5,850,135 A | 12/1998 | Kuki et al. | |
| 5,851,186 A | 12/1998 | Wood et al. | |
| 5,888,087 A | 3/1999 | Hanson et al. | |
| 5,891,035 A | 4/1999 | Wood et al. | |
| 5,892,299 A * | 4/1999 | Siewert et al. | 307/85 |
| 5,897,498 A | 4/1999 | Canfield, II et al. | |
| 5,938,607 A | 8/1999 | Jago et al. | |
| 6,031,356 A * | 2/2000 | Harada et al. | 320/119 |
| 6,117,085 A | 9/2000 | Picatti et al. | |
| 6,142,940 A | 11/2000 | Lathbury et al. | |
| 6,241,673 B1 | 7/2001 | Williams | |
| 6,312,381 B1 | 11/2001 | Knell et al. | |
| 6,364,839 B1 | 4/2002 | Little et al. | |
| 6,424,120 B1 * | 7/2002 | Chen | 320/125 |
| 6,435,109 B1 | 8/2002 | Dell et al. | |
| 6,436,039 B1 | 8/2002 | Lannutti et al. | |
| 6,443,543 B1 | 9/2002 | Chiang | |
| 6,468,213 B1 | 10/2002 | Knell et al. | |
| 6,471,651 B1 | 10/2002 | Hwang et al. | |
| 6,488,625 B1 | 12/2002 | Randall et al. | |
| 6,493,217 B1 | 12/2002 | Jenkins, Jr. | |

(Continued)

*Primary Examiner*—Raymond N Phan
(74) *Attorney, Agent, or Firm*—Fulbright & Jaworski L.L.P.

(57) ABSTRACT

When portable diagnostic medical equipment is placed into a dock, or docking station, the batteries of the docking station are used in a hierarchical manner to insure that the batteries in the portable equipment become charged and that any power needed to run the portable device is provided from a power source local to the docking station. In one embodiment, the docking station has a plurality of batteries and the system is designed so that when a portable diagnostic device is docked, the power from the docking station batteries will be used in a predetermined usage pattern so as to preserve (and charge) the batteries in the portable diagnostic tool.

18 Claims, 3 Drawing Sheets

U.S. PATENT DOCUMENTS

| | | | |
|---|---|---|---|
| 6,493,220 B1 | 12/2002 | Clark et al. | |
| 6,497,664 B1 | 12/2002 | Randall et al. | |
| 6,508,763 B1 | 1/2003 | Urbano et al. | |
| 6,517,491 B1 | 2/2003 | Thiele et al. | |
| 6,524,244 B1 | 2/2003 | Knell et al. | |
| 6,542,846 B1 * | 4/2003 | Miller et al. | 702/132 |
| 6,561,979 B1 | 5/2003 | Wood et al. | |
| 6,592,521 B1 * | 7/2003 | Urbano et al. | 600/441 |
| 6,595,921 B1 | 7/2003 | Urbano et al. | |
| 6,629,928 B1 | 11/2003 | Dolan et al. | |
| 6,716,167 B1 | 4/2004 | Henderson et al. | |
| 6,721,178 B1 | 4/2004 | Clark et al. | |
| 6,852,081 B2 | 2/2005 | Sumanaweera et al. | |
| 6,980,419 B2 * | 12/2005 | Smith et al. | 361/681 |
| 7,009,840 B2 | 3/2006 | Clark et al. | |
| 7,013,163 B2 * | 3/2006 | Jaggers et al. | 455/557 |
| 7,037,264 B2 | 5/2006 | Poland | |
| 7,037,267 B1 * | 5/2006 | Lipson et al. | 600/454 |
| 7,141,020 B2 | 11/2006 | Poland et al. | |
| 7,188,621 B2 * | 3/2007 | DeVries et al. | 128/204.21 |
| 7,332,890 B2 | 2/2008 | Cohen et al. | |
| 7,591,786 B2 | 9/2009 | Holmberg et al. | |
| 7,594,668 B2 | 9/2009 | Arceta et al. | |
| 7,612,999 B2 | 11/2009 | Clark et al. | |
| 7,621,544 B2 | 11/2009 | Rossini | |
| 7,679,522 B2 | 3/2010 | Carpenter | |
| 2001/0055978 A1 * | 12/2001 | Herrod et al. | 455/517 |
| 2002/0016545 A1 | 2/2002 | Quistgaard et al. | |
| 2002/0103007 A1 * | 8/2002 | Jaggers et al. | 455/557 |
| 2002/0143256 A1 | 10/2002 | Wing et al. | |
| 2004/0004460 A1 * | 1/2004 | Fitch et al. | 320/108 |
| 2004/0150963 A1 | 8/2004 | Holmberg et al. | |
| 2004/0152982 A1 | 8/2004 | Hwang et al. | |
| 2004/0158154 A1 | 8/2004 | Hanafy et al. | |
| 2006/0098864 A1 | 5/2006 | Ziel | |
| 2007/0274693 A1 * | 11/2007 | Farbarik | 388/806 |
| 2008/0316045 A1 | 12/2008 | Sriharto et al. | |

* cited by examiner

DOCKING STATION WITH HIERARCHAL BATTERY MANAGEMENT FOR USE WITH PORTABLE MEDICAL EQUIPMENT

CROSS-REFERENCE TO RELATED APPLICATIONS

The present application is related to co-pending U.S. Design Patent Application 29/268,170, entitled "ULTRASOUND DISPLAY APPARATUS," U.S. Design Patent Application 29/268,134, entitled "MOBILE SUPPORT STRUCTURE FOR MEDICAL EQUIPMENT," and U.S. Design Patent Application 29/268,131, entitled "TILT CONTROL APPARATUS," all filed concurrently herewith, the disclosures of which are hereby incorporated by reference.

TECHNICAL FIELD

This invention relates to medical equipment and more particularly to docking stations for use with such medical equipment and even more particularly to docking stations having auxiliary power management.

BACKGROUND OF THE INVENTION

All too often, minutes, and sometimes even seconds may mean the difference between life and death in hospital emergency rooms, EMT ambulances and other trauma sites, such as for example, explosion and crash sites, battlefields, etc. The advent of portable diagnostic equipment, such as sonogram equipment, now allows first responders to diagnose internal trauma and other ailments. The mortality and morbidity rate is thus decreased when the diagnostic tools that were once only available at fixed locations, such as hospitals and other trauma centers, can be brought to a patient.

The same positive results that stem from fast diagnostic capabilities exist in fixed locations when the equipment can be easily moved from location to location instead of remaining fixed. This then allows the diagnostic tools to move to the patient instead of the patient being moved to the equipment.

This portability is not without some complications. Even with highly portable equipment there sometimes is a need to "rest" the equipment on a dock so that the care giver can adjust knobs, take notes, move the probe, download information, charge the battery, and/or perform other tests on a patient. Also, all portable equipment must have a source of power. When working in a fixed facility, that source of power is the electrical utility usually manifest by power outlets spaced apart on a wall. When the device is in the portable mode a battery inside the device is used to provide power. However, just like so many of the devices (cellular telephones, pagers, etc) that are in common usage, battery management becomes critical.

When any number of different people use a certain piece of equipment, such as a medical diagnostic tool, in a portable mode, battery management becomes critically important. One can hardly imagine a more inopportune time for the power to fail than when a measurement is being taken on a critically sick or injured person using a portable diagnostic tool. Precious life-threatening minutes are then lost in opening the device, retrieving the old battery, finding a new charged battery and then inserting the new battery and resealing the device. And all this presumes that the care giver has a freshly charged battery near by. In fast-paced trauma situations, this can be problematical.

SUMMARY

When portable diagnostic medical equipment is placed into a dock, or docking station, the batteries of the docking station are used in a hierarchical manner to insure the system battery maintains its maximum charged value. In one embodiment, the docking station has a plurality of batteries and the system is designed so that when a portable diagnostic device is docked, the power from the docking station batteries will be used in a predetermined usage pattern so as to preserve (and optionally charge) the batteries in the portable diagnostic tool.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
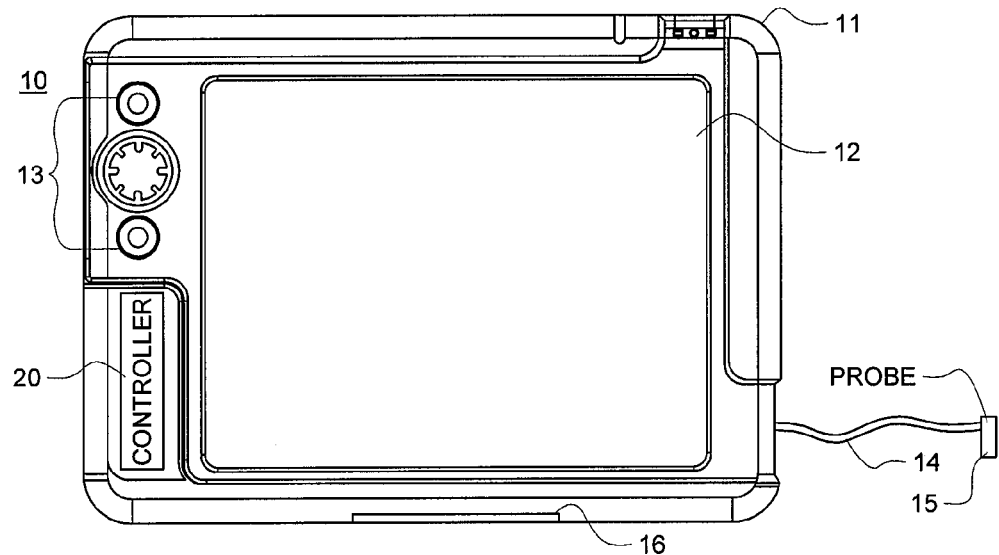
FIG. 1 shows one embodiment of a medical diagnostic tool operating in portable mode in accordance with the principals of the concepts of this invention.

FIG. 1 shows one embodiment of medical diagnostic tool 10 operating in portable mode in accordance with the principals of the concepts of this invention. One example of such a tool is shown in the above-identified co-pending design patent application. Medical diagnostic tool 10, in this embodiment a hand-held ultrasound diagnostic tool, is shown with housing 11 display screen 12, input keys 13 and probe 15 connected to the tool by cable 14. Also shown are connector 16 used when tool 10 is in mated relationship with dock 30 (FIG. 30). Connector 16 also provides control for allowing the tool to "know" when it is in such mated relationship.

When tool 10 is in portable or hand-held mode power is supplied to the device by one or more batteries (as will discussed with respect to FIG. 2) internal to tool 10 as contained, for example, within controller 20.

Figure 2:
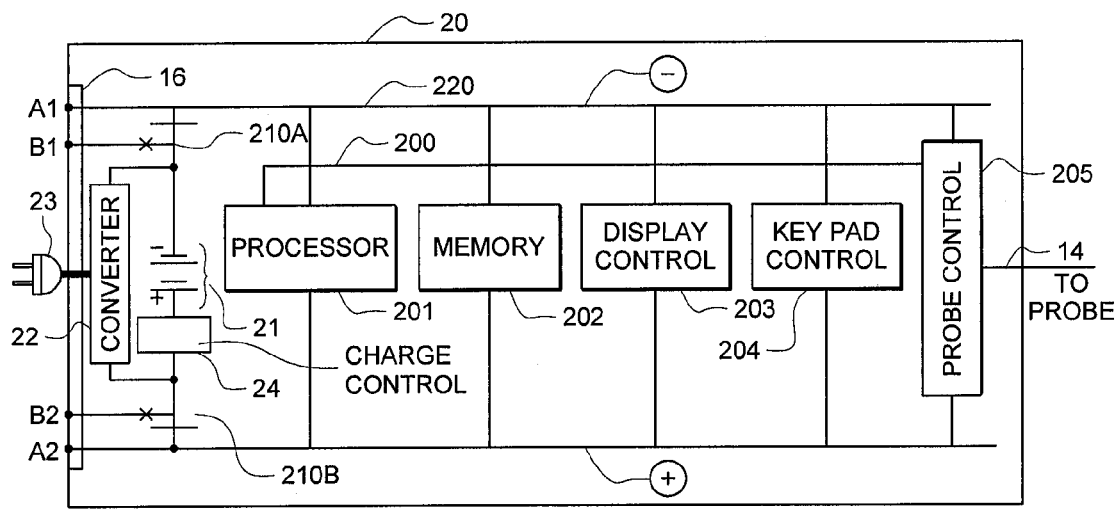
FIG. 2 shows one embodiment of a controller for operating the diagnostic tool shown in FIG. 1.

FIG. 2 shows one embodiment of a controller, such as controller 20, for operating diagnostic tool 10. In the embodiment controller 20 is shown with various internal control devices such as, for example, processor 201, memory 202, display control 203, keypad control 204 and probe control 205. Bus 200 allows these device to work together and the operation of these devices, as well as other internal control devices for diagnostic tools, and especially for ultrasound devices, are well-known in the art and will not be further discussed herein.

Battery 21 serves to provide power to the control devices and systems of device 10 when device 10 is operating in hand-held mode and not plugged into a source of premises power. When premises power is available and being used, plug 23 would deliver power to converter 22 (in one embodiment) which in turn delivers power to the control devices. Note that converter 22 can be external to the device if desired. Converter 22 could be assisted by battery 21. If desired, battery 21 can be separated from the external source of power, or battery 21 can become charged from converter 22. In some situations this charge can be controlled by a control device, such as charge control 24 (which could be external to the device) and which operates in the well-known fashion to prevent battery 21 from becoming overcharged. While only one battery 21 is shown, many such batteries can be used.

Note that contact 210 is in the "normal" mode such that power is available to flow from battery 21, or from converter 22, to power distribution bus 220. When processor 201 senses a mated condition with a docking stand, via sensor 16, device 210 serves to isolate battery 21 from input A1 (from dock 30, FIG. 3) as will be discussed hereinafter. Note also that isolating device 210 can be a relay contact or a semi-conductor device or any other type of isolation device desired.

Figure 3:
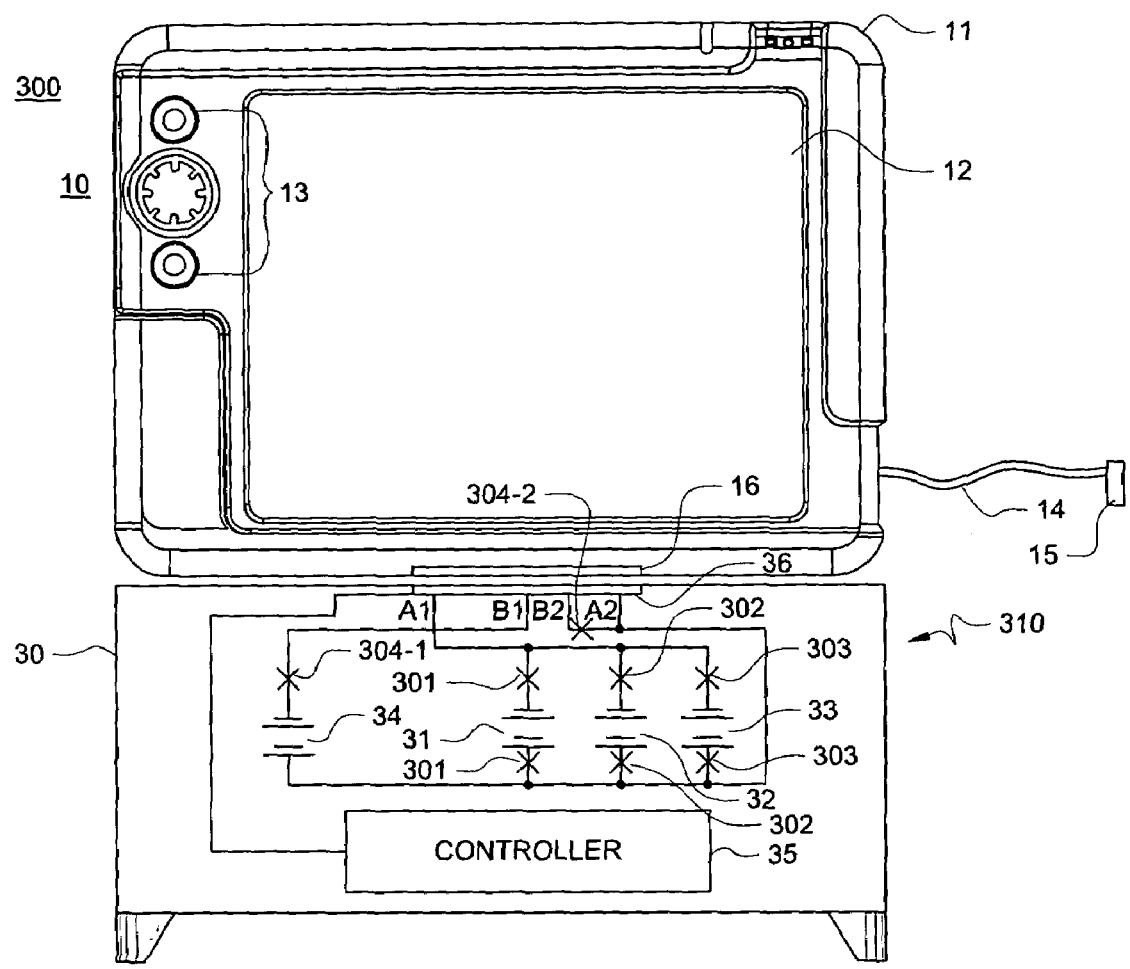
FIG. 3 illustrates the tool of FIG. 1 mated with a dock.

FIG. 3 illustrates the mating of diagnostic tool 10 with dock 30 to form combination 300. When tool 10 is in mated relationship with dock 30 sensors within connector 16 causes controller 35 to respond by enabling one of the three batteries 31, 32 or 33 via control 301, 302 or 303. If desired, the system battery (battery 21, FIG. 2) can also be inserted into the list of batteries that are used for running the tool. The batteries are enabled according to a pre-set pattern so the system battery (if it is connected) is the last to be exhausted. Power from the enabled battery is supplied via lead A1 and connectors 36 and 16 to tool 10 to run the operation of tool 10 even if that tool is being used to perform diagnostic tests. As discussed above, battery 21 in tool 10 is isolated from controller 20 at this time and is available to be charged via leads B1 and B2 from dock 30, FIG. 3, via controls 304-1 and 304-2. Controls 304-1 and 304-2 can be 2-relay contacts or semi conductor devices Also, if desired, one or more batteries 31, 32 and 33 can be connected to leads B1 and B2 if desired so that one or more of these batteries can be used to charge system battery bank 21

Note that in the embodiment shown a separate battery is shown in dock 30 for charging device 10's internal battery. This configuration is not necessary and any arrangement of batteries can be used to run and charge device 10 including having the same power source on dock 30 perform both functions, if desired.

Batteries 31, 32 and 33 are arranged in a hierarchical order but, if desired could be used concurrently, if desired. The theory of operation being that when device 10 is removed from dock 30 its internal system battery, or batteries, will be as fully charged as possible.

Figure 4:
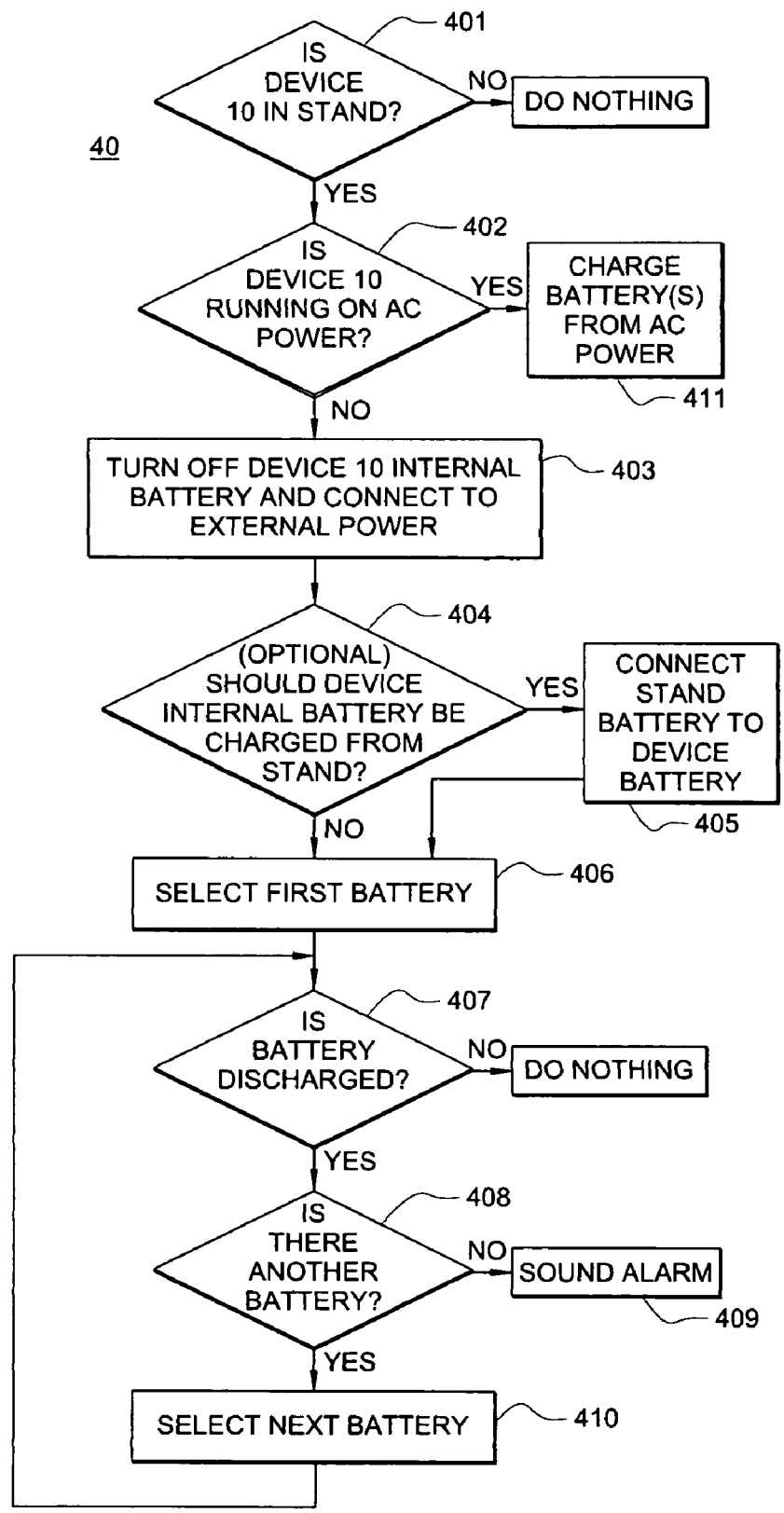
FIG. 4 is one example of a flow chart of system operation.

FIG. 4 is one example of flow chart 40 of system operation. Process 401 determines if the diagnostic device is mated in the dock. If it is, then process 402 determines if the device is running on utility (for example 110V AC) power. If so, theoretically the internal battery of device 10 is being charged from the power source and thus there is not a need for additional charging as shown by process 411.

If, however process 402 determines that device 10 is running on internal power, then process 403 isolates, in one embodiment, the internal battery of device 10. Process 406 selects a first battery to connect to device 10 for operational purposes, as discussed above. Optionally, if process 404 determines that device 10 internal battery is to be charged, then process 405 connects stand battery to the device battery.

When process 407 determines that the first battery is becoming (or has become) discharged, then if process 408 determines that there are other external batteries available a new battery is selected via process 410 and the operation of device 10 continues being powered from external batteries.

If process 408 determines that there are no more charged batteries then, optionally, an alarm is sounded so that a user can plug the dock, or the diagnostic device, into a source of power so that the internal batteries of device 10 remain in the highest possible charge condition so that device 10 will be available for emergent conditions when they occur despite the fact that the device has been operating in a portable mode for a period of time.

Note that while three batteries are shown in dock 30 (and one in device 10) any number of such batteries can be used. By using multiple batteries, particularly in the dock, and by isolating their employment, one or more batteries can be physically changed even while device 10 is operating at full capacity. Note also, that should the external batteries begin to fail, device 10 could be switched, automatically or otherwise, to a lower power consumption state to conserve power. Again, the idea being to maintain device 10 so that it can perform its diagnostic duties fully on portable power at a moments notice in an emergent condition.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A portable medical diagnostic device comprising:
   at least one internal battery for powering said diagnostic device when said device is operating in a portable mode;
   means for accepting power from at least one battery contained in a docking station to which said diagnostic device becomes attached; and
   means for isolating said internal battery from the circuit providing power to the components of said diagnostic device and switching in an ordered manner through a plurality of batteries external to said diagnostic device, said power being accepted whether said diagnostic device is in a quiescent state or whether said diagnostic device is being used for performing diagnostic functions on a patient while mated with said docking station.

2. The device of claim 1 wherein said accepting means is operable for charging any of said diagnostic device's batteries that requires a charge even while said diagnostic device is being used for performing diagnostic functions on a patient while mated with said docking station.

3. The device of claim 2 wherein said portable medical device performs ultrasound testing.

4. A method of maintaining the batteries of a portable medical diagnostic device charged, said method comprising:
   when said diagnostic device is being operated from batteries internal to said device, substituting operation of said device from said internal batteries to at least one battery external to said device, said substituting being triggered by said device becoming positioned in a support; and
   charging said batteries internal to said device via a secondary circuit isolated from the components of said diagnostic device, wherein said substituting further comprises switching in an ordered manner through a plurality of batteries external to said diagnostic device.

5. The method of claim 4 wherein said portable medical device is a hand-held ultra sound testing device.

6. The method of claim 5 further comprising:
   charging said internal diagnostic device battery while said diagnostic device is positioned in said support and while said diagnostic device is performing its normal functions with respect to patients.

7. The method of claim 6 wherein said external batteries are positioned physically within said support.

8. A method for using a hand-held portable diagnostic test device, said method comprising:
   performing diagnostic testing on patients using said diagnostic test tool while said diagnostic test device is operable from power supplied by at least one battery internal to said diagnostic test tool,
   placing said diagnostic test tool in a portable support;
   continuing to perform diagnostic testing on patients while said diagnostic test device is supported by said portable support;
   automatically switching said diagnostic test device to operate from at least one battery contained within said support; and
   substituting operation of said device from said at least one battery within said support to said at least one battery internal to said diagnostic test tool, after said at least one battery within said support have been depleted, and lowering power consumption of said at least one battery internal to said diagnostic test tool.

9. The method of claim 8 wherein said support contains a plurality of batteries and wherein said power is supplied by one battery at a time in a pre-set hierarchical pattern.

10. The method of claim 9 further comprising:
    charging at least one of said batteries in said diagnostic test device from power supplied from said support while said diagnostic test device is supported by said support.

11. The method of claim 10 wherein said diagnostic test device performs ultrasound testing.

12. A hand-held ultrasound system operable for performing diagnostic testing on patients, said system comprising;
    a portable support separate from a hand-held ultrasound device, said support having contained therein at least one source of power;
    means for displaying graphics of a diagnostic test being performed;
    means internal to said device for providing said displaying means when said device becomes unplugged from an external source of power; and
    means for supplying power to said displaying means exclusively from said source of power within said portable support when said device is mated with said support, wherein said support power source comprises a plurality of batteries arranged to provide power to said displaying means in an hierarchical manner.

13. The system of claim 12 wherein said supplying means is activated without human intervention when said device becomes mated with said support.

14. The system of claim 12 further comprising:
    means for charging said device internal means from said supplying means.

15. The portable medical diagnostic device of claim 1 further comprising:
    means for charging said internal battery via a secondary circuit isolated from the components of said diagnostic device.

16. The diagnostic device of claim 1 further comprising:
    circuitry for lowering power consumption of said internal battery when said internal batteries are used to power the device after all batteries in said docking station have been depleted.

17. The method of claim 4 further comprising:
    substituting operation of said device from at least one of said external batteries to said internal batteries and lowering power consumption of said internal batteries after said external batteries have been depleted.

18. The method of claim 8 further comprising:
    charging said internal batteries via a secondary circuit isolated from the components of said diagnostic device.

\* \* \* \* \*